(12) United States Patent
Smith

(10) Patent No.: US 10,773,701 B2
(45) Date of Patent: Sep. 15, 2020

(54) ELECTROMECHANICAL ACTUATOR

(71) Applicant: TRW Limited, Solihull, West Midlands (GB)

(72) Inventor: Nigel Peter Smith, Eardiston (GB)

(73) Assignee: ZF Automotive UK Limited, Solihull, West Midlands ( * ) Notice: Subject to any disclaimer, the term of this patent is extended or adjusted under 35 U.S.C. 154(b) by 125 days.

(21) Appl. No.: 15/758,282

(22) PCT Filed: Sep. 5, 2016

(86) PCT No.: PCT/GB2016/052732
§ 371 (c)(1),
(2) Date: Mar. 7, 2018

(87) PCT Pub. No.: WO2017/042546
PCT Pub. Date: Mar. 16, 2017

(65) Prior Publication Data
US 2018/0208171 A1 Jul. 26, 2018

(30) Foreign Application Priority Data
Sep. 7, 2015 (GB) .................................. 1515843.9

(51) Int. Cl.
*B60T 13/74* (2006.01)
*B60T 8/40* (2006.01)
(Continued)

(52) U.S. Cl.
CPC .......... *B60T 13/745* (2013.01); *B60T 8/4018* (2013.01); *B60T 8/4072* (2013.01); *B60T 8/4266* (2013.01);
(Continued)

(58) Field of Classification Search
CPC ...... F16D 65/46; F16D 2121/24; F16D 65/18; F16D 65/186; B60T 13/745;
(Continued)

(56) References Cited

U.S. PATENT DOCUMENTS 3,877,629 A 4/1975 Louw et al.
5,829,557 A 11/1998 Halasy-Wimmer et al.
(Continued)

FOREIGN PATENT DOCUMENTS

DE 10317104 B3 7/2004
DE 102011102860 A1 12/2012
(Continued)

OTHER PUBLICATIONS

Patent Acts 1977: Search Report under Section 17(5), Application No. GB1515843.9, dated Mar. 2, 2016.
(Continued)

*Primary Examiner* — Alex W Mok
(74) *Attorney, Agent, or Firm* — MacMillan, Sobanski & Todd, LLC

(57) ABSTRACT

An electromechanical actuator for use in a hydraulic braking circuit of a vehicle comprises an electric motor having a stator and a rotor, and a linear actuator that is located within the motor. The linear actuator comprises an elongate shaft having a screw part at one end carrying an external thread that extends along a portion of the shaft, and a fixing part at the other end shaft, the linear actuator further comprising a drive nut that surrounds the screw part of the shaft and is located at least in a retracted position inside an enlarged bore of the first portion of the rotor body, the drive nut being connected to the screw part through a set of balls that engage the threads of the drive nut and screw part, and the fixing
(Continued)

part of the shaft includes a tapering portion that engages a complimentary tapering portion of the bore in the second portion of the rotor body.

10 Claims, 4 Drawing Sheets

(51) Int. Cl.
  *B60T 8/42* (2006.01)
  *B60T 8/48* (2006.01)
  *F16D 65/18* (2006.01)
  *H02K 7/06* (2006.01)
  *F16D 65/46* (2006.01)
  *F16H 25/22* (2006.01)
  *F16D 121/24* (2012.01)
  *F16H 25/20* (2006.01)

(52) U.S. Cl.
  CPC ............ *B60T 8/4863* (2013.01); *F16D 65/18* (2013.01); *F16D 65/186* (2013.01); *F16D 65/46* (2013.01); *H02K 7/06* (2013.01); *B60T 8/489* (2013.01); *F16D 2121/24* (2013.01); *F16H 25/2204* (2013.01); *F16H 2025/2075* (2013.01)

(58) Field of Classification Search
  CPC .... B60T 8/4018; B60T 8/4072; B60T 8/4266; B60T 8/4863; B60T 8/489; F16H 2025/2075; F16H 25/2204; H02K 7/06

USPC ...................................................... 310/12.14
  See application file for complete search history.

(56) References Cited

U.S. PATENT DOCUMENTS

| 9,340,194 | B2 | 5/2016 | Giering |
| 2012/0261220 | A1 | 10/2012 | Sakashita |
| 2014/0300228 | A1 | 10/2014 | Rapp et al. |
| 2015/0076972 | A1 | 3/2015 | Leiber et al. |
| 2015/0115778 | A1 | 4/2015 | Drennen et al. |

FOREIGN PATENT DOCUMENTS

| DE | 102012214552 A1 | 3/2013 |
| EP | 0154974 A2 | 9/1985 |
| EP | 0317302 A2 | 5/1989 |
| EP | 1320174 A1 | 6/2003 |
| EP | 1780873 A1 | 5/2007 |
| WO | 2013/156391 A1 | 10/2013 |

OTHER PUBLICATIONS

PCT International Search Report and the Written Opinion, Application No. PCT/GB2016/052732 filed Sep. 5, 2016, dated Nov. 15, 2016.

ELECTROMECHANICAL ACTUATOR

CROSS-REFERENCE TO RELATED APPLICATIONS

This application is the National Phase of International Application PCT/GB2016/052732 filed Sep. 5, 2016 which designated the U.S. and that International Application was published in English under PCT Article 21(2) on Mar. 16, 2017 as International Publication Number WO 2017/042546 A1. PCT/GB2016/052732 claims priority to Great Britain Application No. 1515843.9, filed Sep. 7, 2015. Thus, the subject nonprovisional application claims priority to GB1515843.9, filed. Sep. 7, 2015. The disclosures of both applications are incorporated herein by reference.

BACKGROUND OF THE INVENTION

This invention relates to improvements in electromechanical actuators, especially for use in a hydraulic braking system for a vehicle.

In a traditional hydraulic braking system, brake pressure is created by the driver pressing on a foot pedal, which moves a push rod that in turn displaces a diaphragm in a vacuum boosted brake servo. The servo amplifies the pressure applied by the driver, and generates an increased hydraulic pressure in a hydraulic fluid connected to a brake caliper or drum.

It is known also to provide a braking system in which the pressure applied by the brake is controlled by an electromechanical actuator. This allows the brakes to be applied using force from the actuator rather than purely relying on the driver pressing the pedal. This arrangement also allows the brakes to be applied independent of the driver, for instance during an emergency or as part of a vehicle stability control system or a hill hold function.

A suitable actuator should have a fast response time and be capable of generating a relatively large pressure increase, and most conveniently the actuator is capable of driving a piston back and forth within a cylinder. It will be appreciated that an actuator capable of such performance can be used in a wide range of applications, and is not just limited to use in a hydraulic braking system.

In one arrangement, disclosed in U.S. Pat. No. 4,909,577, an electromagnetic actuator comprises a motor having a stator and a rotor. The rotor is hollow and is provided on an inner surface with a helical groove that forms part of a ball screw linear drive located inside the rotor. The drive comprises an elongate screw having an external helical groove that complements that of the rotor. The two grooves are filled with metal balls and the balls act on the screw to create a linear movement of the screw relative to the stator. The linear movement of the screw is used to control the hydraulic pressure in a hydraulic braking circuit of a vehicle. The rotor is supported by bearings at both ends.

In an alternative arrangement disclosed in the applicant's earlier patent EP0317182 a stepper motor has a screw that is fixed to the protruding end of the rotor of a motor so that as the rotor rotates the screw also rotates. The screw protrudes into a bore formed in an end face of a piston that is in turn inserted in the bore of a cylinder filled with hydraulic fluid. The piston is prevented from rotating in the cylinder, and as the rotor rotates, the piston is moved along the cylinder. This alters the pressure of the fluid in the hydraulic brake circuit connected to the cylinder.

SUMMARY OF THE INVENTION

According to a first aspect the invention provides an electromechanical actuator for use in a hydraulic braking circuit of a vehicle comprising: an electric motor having a stator and a rotor, and a linear actuator that is located within the motor, in which:

The stator is located within a housing having a first end and a second end, the rotor is located inside the housing and comprises an elongate rotor body having a bore passing from one end of the body to the other, the bore being enlarged over a first portion of the body located towards the first end of the motor, and being of reduced size over a second portion of the body located towards the second end of the motor, the linear actuator comprising an elongate shaft that is located within the bore in the elongate rotor body, the shaft having a screw part at one end carrying an external thread that extends along a portion of the shaft that is located within the enlarged portion of the bore in the rotor body, and a fixing part at the other end shaft that is a tightly located into the bore of the second portion of the elongate body to prevent radial movement of the shaft relative to the elongate body, the linear actuator further comprising a drive nut that surrounds the screw part of the shaft and is located at least in a retracted position inside the enlarged bore of the first portion of the rotor body, the drive nut having an internal thread and being connected to the screw part through a set of balls that engage the threads of the drive nut and screw part, and in which the fixing part of the shaft includes a tapering portion that engages a complimentary tapering portion of the bore in the second portion of the rotor body.

In pulling the shaft into engagement with the rotor body, the applicant has appreciated that it is important that the shaft cannot be pulled right through the rotor body. The limit of movement of the shaft towards the first end of the housing is controlled by providing a tapered outer portion of the shaft that engages a complimentary tapered inner portion of the bore in the second portion of the rotor body. By tapered we mean that the fixed part of the shaft will therefore reduce in outer size within the rotor, decreasing in size in the direction away from the screw part of the shaft that carries the locking nut.

The fixed part of the shaft may have a cylindrical cross section along its length, so that the tapering portion is defined by a gradual reduction in the diameter of the fixing part.

Using a cylindrical cross sectional simplifies alignment of the rotor body and shaft during assembly and is easier to machine during production than a more complicated shape. Of course, other cross sections could be provided such as a splined connection although this would require more careful alignment during assembly.

As well as enabling the shaft to self-centre in the rotor body during assembly, the taper also provides a large area over which any axial load applied to the shaft is spread. The taper also provides an efficient means of locking the leadscrew to the rotor so that torque can be transmitted across the interface, this being an inherent facility of tapered joints provided that the taper angle is shallow enough—which it is in this case.

This ability to carry a high axial load is significant when the actuator is used in a hydraulic braking system where the movement of the nut towards the open end of the motor is used to compress a hydraulic fluid. This will generally mean that the load along the shaft towards the first end of the housing is far greater than the load in the opposite direction as the nut is retracted further into the motor.

The tapered portion may extend over a major part of the bore in the rotor which the screw contacts.

The tapered portion may have a pressure angle relative to the axis of the rod of between 1 degree and 10 degrees.

The tapered portion may reduce in diameter linearly over its length.

In one embodiment, the rotor body may be secured relative to the stator by a bearing assembly that is fixed to the second part of the elongate rotor body, the other end of the rotor body being otherwise unsupported and overhung from the bearing assembly.

The second part of the rotor body may be located concentrically within the stator of the motor and the first part of the rotor body may be offset axially from the stator.

The housing, stator, rotor body and shaft may all be generally cylindrical when viewed in cross section and may all have their long axes aligned on a common central axis of the motor.

The rotor body may be secured to the housing through a bearing race assembly of the kind having an annular inner race that is secured to the second part of the rotor body, an annular outer bearing race that is secured to the housing, and a plurality of bearings located between the races. These may be ball bearings or roller bearings and may be constrained to run in annular grooves in the bearing races.

Because the rotor is only supported at one end, with the portion that sits inside the stator being overhung from that one end, it is important that the bearing prevents any significant radial and axial movement of the rotor.

The bearing assembly may therefore comprise a four point contact bearing. Alternatively, the bearing assembly could be a double-row angular contact bearing.

The inner bearing race may be a snug fit, a press fit or interference fit, onto the second portion of the rotor body. However, the applicant has appreciated that In general, four-point contact bearings where used are not tolerant of being a tight press-fit or significant interference fit onto a shaft as this would cause the inner race to expand slightly, causing the bearing to be slightly tight between the inner race, balls and outer race, raising friction and probably affecting the load-life of the bearing adversely. The shaft should therefore be a transition fit or very light sliding fit within the bearing assembly.

The outer bearing race must not be able to move radially or axially relative to the housing and so it should be securely fixed to the housing. It may, for example, be a snug fit onto a receiving part of the housing, and may be pressed into a position on the receiving part from inside the housing. i.e. by pressing from the first end of the housing towards the second end. The engagement should be tight enough to stop the bearing outer race being pulled from the housing as a load is applied to the nut, and may be an interference fit. An adhesive could be used to prevent movement.

To secure the rotor body to the housing, and the shaft to the rotor body, the portion of the shaft that extends through the reduced width section of bore in the rotor may be provided with an external thread, and a locking nut may be provided that has an internal thread that engages the thread on the external thread, the locking nut being sized so that when located on the thread of the shaft the locking nut engages both the rotor and the inner bearing race whereby as the locking nut is tightened the shaft is pulled into engagement with the bore of the rotor towards the first end of the motor housing and at the same time the inner race of the bearing is pressed by the locking nut onto the rotor in a direction towards the second end of the housing.

An opening may be provided in an end wall of the housing that closes the second end of the housing to allow access to the locking nut.

The outer face of the rotor body that is closest to the first end of the housing may be provided with a shoulder that locates an end face of the inner bearing, the locking nut tightening the inner race onto this shoulder. The shoulder may be set back from the end of the rotor body by a distance approximately equal to the thickness of the inner bearing race, or the nut may project over the end of the rotor body slightly to make up the difference.

The force applied by the locking nut to the inner bearing race may in turn pull the bearing assembly towards the first end of the housing so as to securely pull the outer bearing race into engagement with the housing. The one locking nut therefore will secure the shaft, rotor body, and bearing assembly onto the housing.

The two parts of the actuator—the motor and the linear actuator, may be constructed independently as two subassemblies prior to pressing the linear actuator into the motor.

A method of construction may therefore comprise first assembling the bearing assembly into the housing, pressing the rotor into the inner bearing race and then pressing the rotor into the motor from the first end of the housing to locate the outer bearing race.

Having assembled the motor with the rotor body, the linear actuator with the drive nut preassembled to the screw of the shaft can then be married up to the rotor body. Finally the locking nut, where provided, can be used to hold the motor and linear actuator together.

This ability to assemble the linear actuator separately from the motor and then mate them together allows the linear actuator to be preassembled to part of a braking system, such as a hydraulic cylinder, before the motor is offered up. Once assembled with the actuator inside the motor housing a very compact and robust assembly can be achieved.

The linear actuator can then be assembled with the drive nut on the screw portion, and then pressed into the rotor. The locking nut may then be secured to hold the rod of the linear actuator in position in the rotor and hold the rotor onto the inner bearing.

The housing of the motor that locates the stator may comprise a cylindrical can having a closed base at the second end, optionally with an access hole permitting access to the locking nut that secures the actuator and rotor. This can may comprise a thin walled metal can that may be drawn from a flat blank in a similar manner to that in which a beverage can is produced. The closed base provides the receiving part for the bearing assembly. The housing most preferably comprise a thin-walled steel can, or a can made from cast aluminium with followed by a machining operation.

The applicant has appreciated that a problem could arise if the nut is tightened too firmly into the enlarged bore of the rotor such that it binds with the wall that defines the stepped interface between the enlarged bore and narrower bore.

To prevent or reduce the risk of binding, the actuator may comprise a resilient end stop that is located between the drive nut and the closed end of the first portion of the rotor body where it joins the second portion of the rotor body. This portion may correspond to the bore in the rotor body stepping down in size and may comprise a generally flat radial internal wall of the rotor body.

The end stop may comprise one or both of the following components: a resilient washer and a low friction washer, at least the low friction washer being free to rotate around the shaft and relative to the rotor. Where both are provided they may be placed in a stack, with the low friction washer preferably closest to the drive nut.

The resilient washer may comprise a wavy washer or a Belleville washer, each being able to compress axially whilst providing a resisting force. The key characteristic of the resilient washer is that it has a thickness in the axial direction that can be reduced as a load is applied and that it resists the force attempting to reduce the thickness.

The force provided by the resilient washer as it reaches a fully compressed condition may be chosen to exceed the stall torque of the motor—so that the motor stalls before it fully compresses.

The rotor hollow body may be cylindrical, any may have a circular cross section at any point along its length. The diameter of the outer wall of the cylinder in the region of the rotor with the enlarged bore may be greater than that in the region which is pressed into the bearing assembly, the two portions being connected by a radial shoulder.

The rotor body may have a thin wall thickness in the region of the enlarged bore, and be relatively thicker in the region that is pressed into the bearing.

The rotor body may be of unitary construction.

The stator may comprise a plurality of metal plates around which multiples windings of electrical wire are wrapped, the windings being connected together to form a plurality of motor phases. There may be three phases.

The stator may comprise of several electrical grade sheet steel laminations incorporating pole teeth and slots for the windings that formed the stator magnetic circuit, and over which insulating slot liners and plastic covers (end-caps) may be placed to protect the windings. The windings may consist of several turns per tooth of, say, enameled copper wire and each winding being connected with the other windings to form a multi-phase, for example three phase, non-distributed winding of star or delta connection between phases. The connections between phases may be accomplished at the motor phase connection terminals (the customer connection point) by means of crimped and welded tab features included in the terminals. The rotor magnets are of the rare-earth type.

The motor overall type may be a permanent magnet, three-phase AC synchronous type. Conceivably other types of motor would be suitable such as a DC brushed motor or an AC induction motor, but these latter two types are more bulky for a given output torque than the three-phase AC synchronous type.

The exterior wall of the first part of the rotor body may support a plurality of permanent magnets. The magnets may extend along the length of the rotor and may be retained by an external sleeve. For example, the rotor may consist[[s]] of a steel hub of generally cylindrical form, which may be of forged or cast manufacture and then machined to size, and onto which the permanent magnets are attached with both glue and a thin-walled sleeve fitted over the exterior of the magnets, the latter as secondary retention. The rotor hub is hollow to allow the ball-nut to pass freely inside it and the hub incorporates a cylindrical region and shoulder that accepts a bearing and the tapered centre hole to attach the lead-screw.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
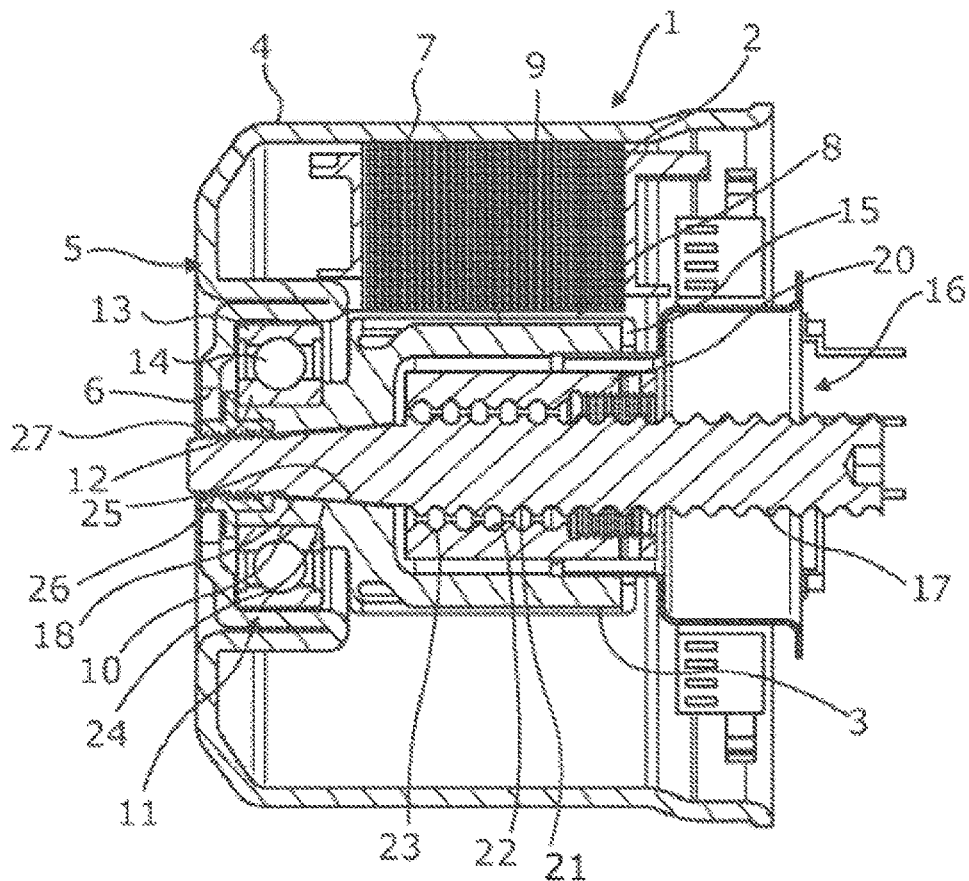
FIG. 1 is a cross section along a vertical plane of a first embodiment of an electromagnetic actuator in accordance with the present invention.

As shown in FIG. 1, a first embodiment of electromechanical actuator 1 in accordance with the present invention comprises two main function parts: a permanent magnet motor, and a linear actuator comprising a drive screw that is secured to the rotor and a drive nut that is connected to the screw through a set of balls.

The motor in this example comprises a stator part 2 and a rotor part 3, both of which are housed within a housing 4 in the form of a drawn metal can. The housing has a cylindrical outer wall that is open at one end (to the right in the Figures) and closed at a second end by a cap. The cap 5 at the closed end is provided with an access hole 6 that is concentric with the axis of the housing (passing through the can from one end to the other), the access hole 6 having a diameter about 10 percent of the diameter of the outer wall of the housing.

Securely located inside the housing towards the open first end is a stator assembly 2. In this example the stator assembly comprises a stack of metal plates around which coils of wire are turned.

Located within the housing, and extending from one end to the other, is a rotor assembly. This comprises a hollow elongate body 8 that is stepped in diameter approximately one third of the way along its length. A first part 9 of the stepped hollow rotor body, located furthest from the closed end of the can and inside the stator 2, has a diameter approximately half of the diameter of the outer can, and a relatively thin wall thickness to define an enlarged cylindrical bore within the first part that is open at the end of the rotor body to face the first end of the housing. The second part 10 of the rotor body that is closest to the closed base of the outer can have a diameter of about $\frac{1}{5}^{th}$ of the diameter of the can. The first part 9 and the second part 10 are joined by a step change in diameter of the cylindrical structure. A bore extends continuously from one end of the rotor body to the other, passing through the smaller diameter second part and the larger diameter first part. This bore has a smaller diameter inside the second part.

A first function of the smaller diameter second part 10 is to secure the rotor structure to the housing, and this is achieved by pressing a four point contact bearing assembly 11 onto the outside of the second part 10 of the rotor body 8. The bearing has an inner race 12 that contact the rotor body, and an outer race 13 that is in turn press fitted onto a locating ring formed in the cap 5 on the inside of the housing. The inner and outer races are connected by ball bearings 14. The bearing assembly is a four point contact bearing assembly and has zero clearance in the radial and axial directions.

The bearing assembly comprising of 12, 13 and 14 ensures that the rotor body is securely located inside the can, and so cannot move axially or radially, or tilt, relative to the stator assembly 2. By providing a support only at one end of the rotor body by a single bearing, and having no bearing towards the open second end of the housing, it becomes possible to reduce the overall length of the assembly by locating a screw and nut ball drive inside the enlarged bore of the rotor body as will now be described.

The larger diameter first part 9 of the rotor 8 serves two functions. The first is to support a stack of permanent magnets 15 around its outer face that cooperate with the stator in a known manner to produce a torque in the rotor as current is applied to the stator. The manner in which this torque is produced is not material to the invention and so will not be explained in any detail.

The second function of the first portion 9 is to define a space into which the drive screw and drive nut of a linear actuator are located. The screw is formed on a part of a shaft 16 that passes right along the rotor body 8 from one end to the other.

The shaft comprises a screw part 17 and a fixing part 18. The fixing part 18 has a reduced diameter and is located in the bore of the second part 10 of the rotor body. The screw part is located inside the enlarged bore of the rotor body. As shown the drive nut 20 is located inside the rotor body. The drive nut 20 has a helical groove 22 on an inner surface that faces a complimentary helical groove 21 on the screw part of the shaft. Balls 23 are located in these grooves so that the drive nut and screw part together form a ball driven linear actuator.

Figure 2:
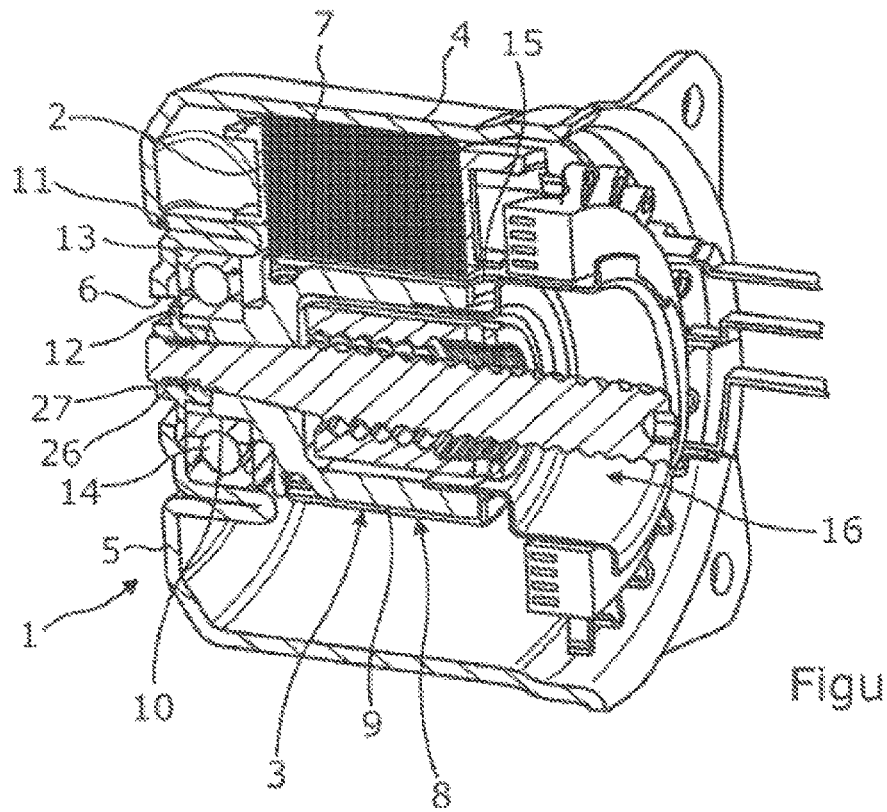
FIG. 2 is a perspective view of the actuator of FIG. 1.

The fixing part of the shaft includes a gently tapered portion 24, which as can be seen in FIGS. 1 and 2 matches a gentle tapered portion 25 of the bore in the second portion of the rotor body. This allows the shaft to be inserted into the bore by press fitting it from the open first end of the housing, the taper ensuring the screw is correctly self centred. This tapered face allows any axial load applied to the screw due to loading of the nut to be resisted by the rotor, and importantly this load is carried over a relatively large area. Additionally, the taper serves to lock the shaft 16 into the rotor assembly 8 such that torque may be transmitted across the interface between these two parts without requiring any key-way, dowel pins or other locking feature besides the tight fit of the two parts provided by the clamping action of the screw thread 26 and nut 27.

To secure the shaft 16 to the rotor body 8, a terminal portion of the fixed part of the shaft 16 is provided with a fine screw thread 26. Access to the thread 26 is achieved by oversizing the bore in the rotor second portion at its open end. A locking nut 27 is then tightened onto this screw thread from outside of the closed end of the can, accessing the thread through the hole 6 in the closed end of the can. As can be seen this locking nut pulls the fixing part into the rotor body and also traps the inner race of the bearing assembly against the rotor so that together the inner race, rotor and screw are rigidly secured. This can be performed simply after the rotor is pressed into place and then the shaft inserted.

The drive nut is not prevented from rotating by the stator, in this example the drive nut being prevented from rotating through its connection to a further component that is separate from the actuator. This means the drive nut does not need to contact the stator, reducing friction. In use, as the rotor rotates the drive nut will move along the nut. The direction of movement of the nut depends on the direction of rotation of the motor, and on the handedness of the threads.

Figure 3:
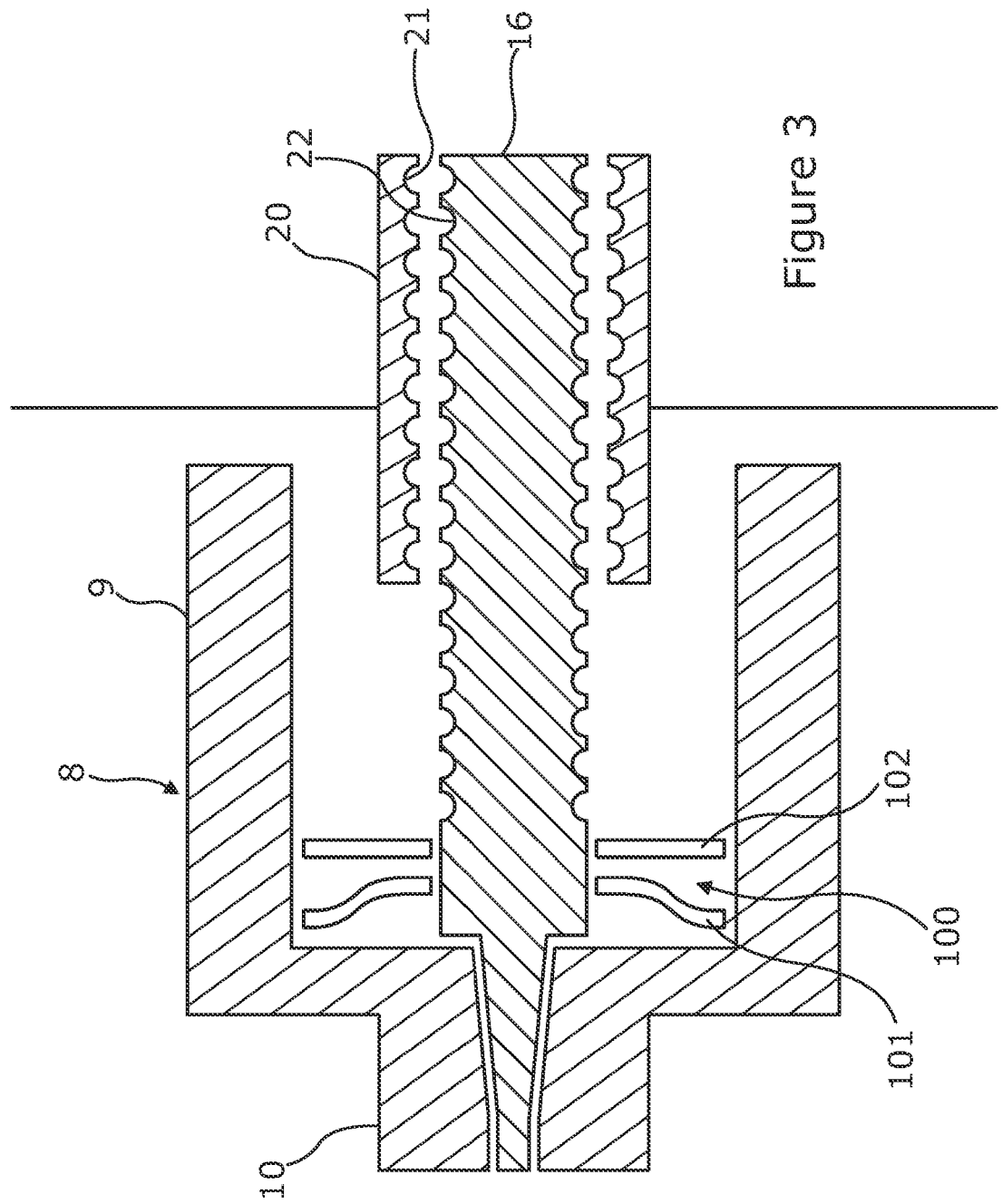
FIG. 3 is a cross section of a part of a second embodiment of an actuator in accordance with the present invention showing the drive nut in a fully extended position.

The maximum outer travel of the drive nut 20 is limited by an end stop (not shown). The inner movement of the drive nut into the rotor body may be limited by contact with the radial wall of the screw, or may be limited by a soft end stop. FIG. 3 illustrates a second embodiment of the present invention in which an end stop 100 is provided. Apart from the presence of the end stop, the actuator of the second embodiment is identical to the first embodiment and so it is only shown in part.

Figure 4:
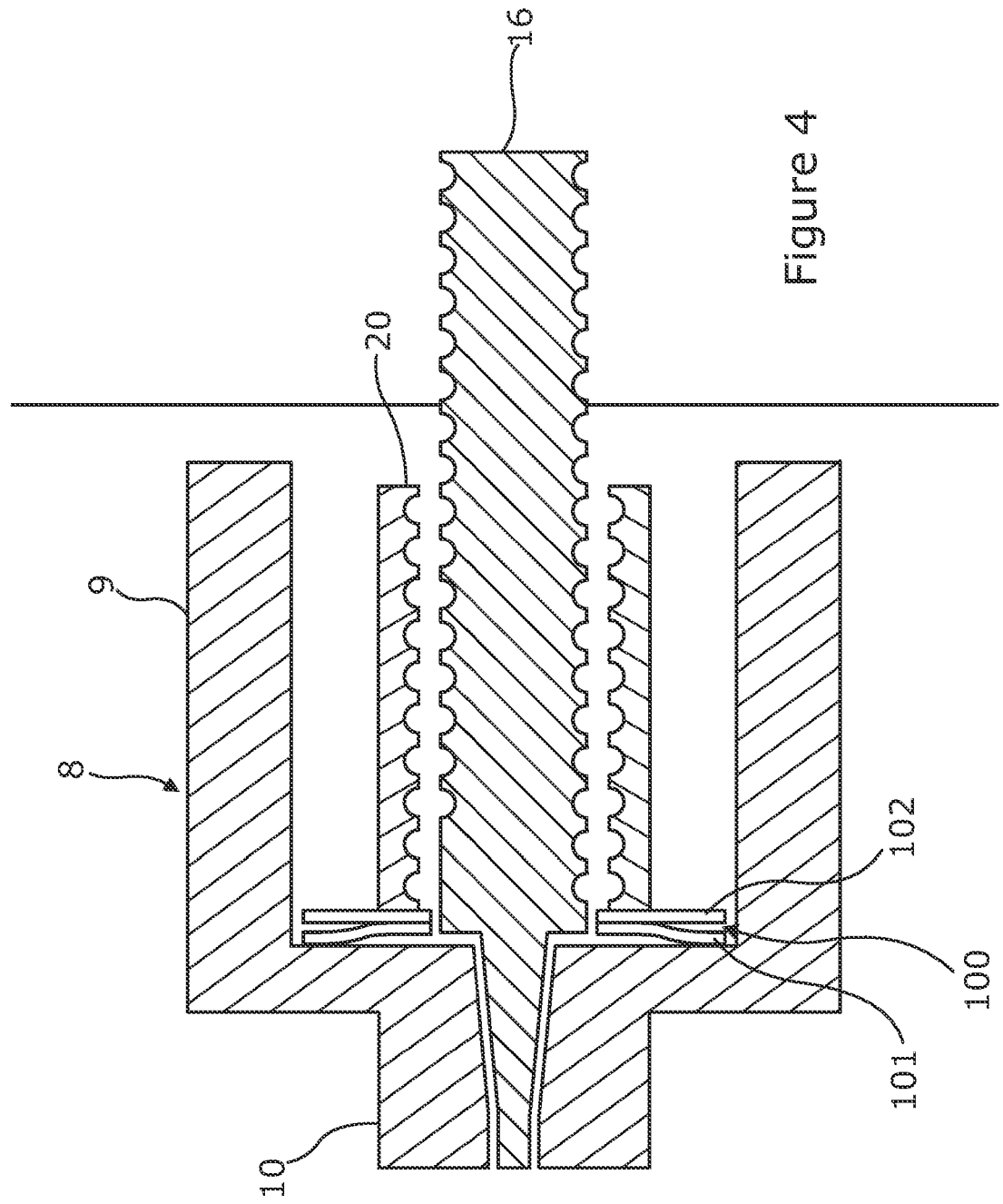
FIG. 4 is a view of the actuator of FIG. 3 with the drive nut of the actuator in a fully retracted position.

The soft end stop 100 comprises a serial stack of two components located around the screw close to the ring shaped wall near the taper. The first is a Belleville washer 101 that abuts the ring shaped wall of the rotor body. The key feature of the washer 101 is that it is not flat but is wavy or conical around its circumference. The second is a flat washer 102 of low friction material or provided with a low friction coating such as PTFE. When the drive nut 20 reaches an end of travel, it will contact the flat washer 102 that is pressed onto the Belleville washer 101. The Belleville washer will then compress as the nut moves further and attempts to flatten the washer 101. At some point the flat low friction washer may rotate a little but very soon the nut will encounter a very high torque loading as the Belleville washer is comprised and will likely stall the motor, either in a controlled or uncontrolled manner. This compressed stated is shown in FIG. 4 of the drawings.

By the use of the two parts 101, 102, the nut should not bind in the event of reversing the motor drive to release the drive nut. The low friction washer will slide over the compressed washer, and in particular if the stall torque of the motor is set to be lower than the torque needed to completely flatten the Belleville washer. Crucially, the compression of the Belleville washer provides a progressive lower-G deceleration of the moving parts, as opposed the higher-G sudden deceleration without the Belleville washer; the lower-G lessening the degree of tightness (lower inertia torque) of the ball-nut against the rotor hub at the end of the nut travel, in addition to the effect of the low-friction qualities of the washer 102.

Figure 5:
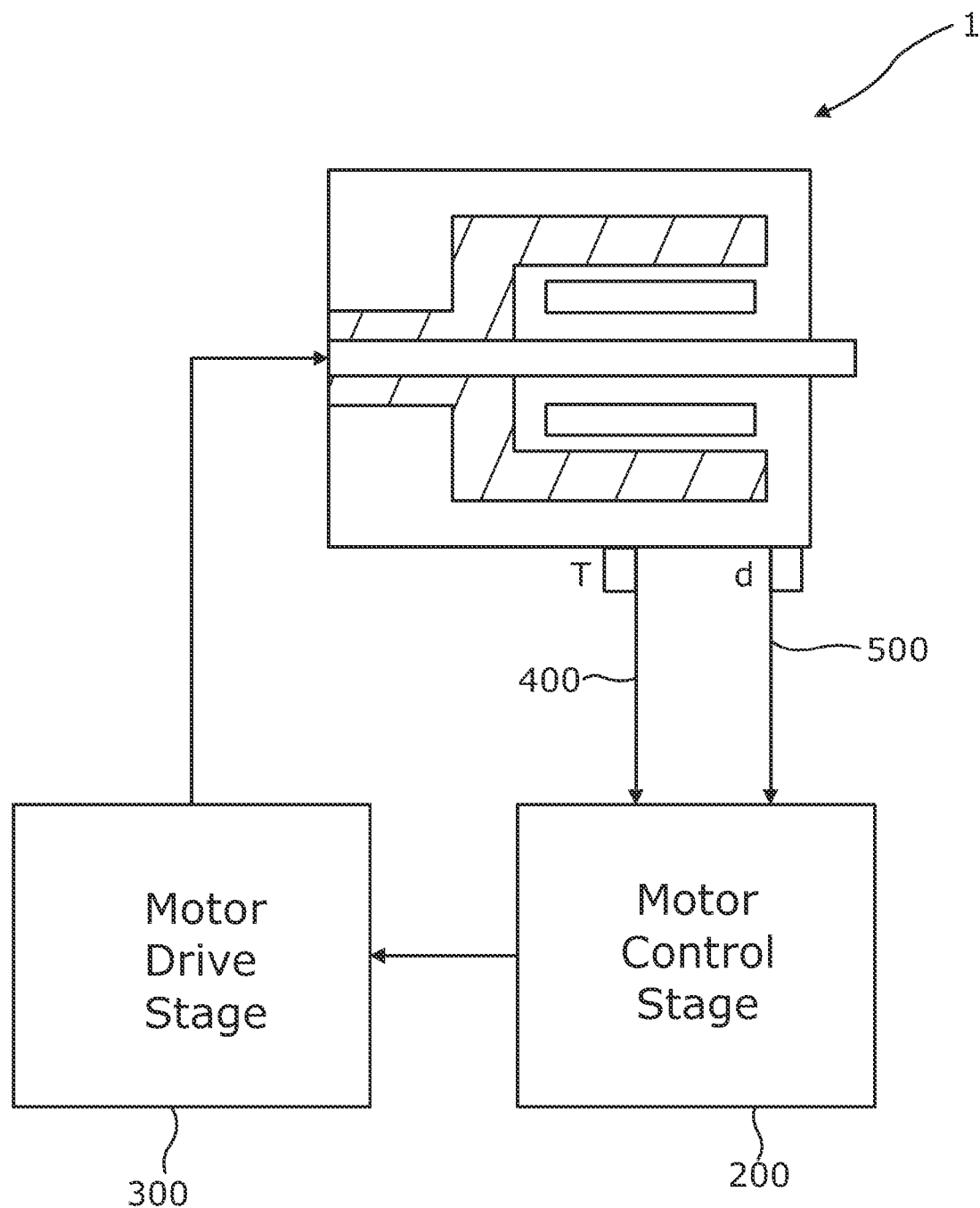
FIG. 5 is a diagram showing the actuator connected to an appropriate control and drive circuit.

FIG. 5 shows the actuator incorporated into a suitable electrical control and drive circuit. The circuit comprises a motor control stage 200 that generates control signals for each phase of the motor, and a motor drive stage 300 that converts the control signals into drive current waveforms for each phase. Typically these drive signals will be pulse width modulated waveforms. To control the speed and direction of the motor of the actuator 1 a torque signal T from a torque sensor 400 may be provided, and a position signal d may be provided that from a position sensor 500. This signal d may indicate the axial location of the drive nut, or the angular position of the rotor body from which the position of the nut may be derived. The torque signal may be used to detect that the end of travel is reached.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electromechanical actuator for use in a hydraulic braking circuit of a vehicle comprising:
    an electric motor having a stator and a rotor, and a linear actuator that is located within the motor, in which:
    the stator is located within a housing having a first end and a second end, the rotor is located inside the housing and comprises an elongate rotor body having a bore passing from a first end of the body to a second end of the body, the bore being enlarged over a first portion of the body located towards the first end of the motor, and being of reduced size over a second portion of the body located towards the second end of the motor,
    the linear actuator comprising an elongate shaft that is located within the bore in the elongate rotor body, the shaft having a screw part at one end carrying an external thread that extends along a portion of the shaft that is located within the first portion of the bore in the rotor body, and a fixing part at the other end of the shaft that is a tightly located into the bore of the second portion of the elongate body to prevent radial movement of the shaft relative to the elongate body, the linear actuator further comprising a drive nut that surrounds the screw part of the shaft and is located at least in a retracted position inside the enlarged bore of the first portion of the rotor body, the drive nut having an internal thread and being connected to the screw part through a set of balls that engage the threads of the drive nut and screw part, and in which the fixing part of the shaft includes a tapering portion that engages a complimentary tapering portion of the bore in the second portion of the rotor body, in which the rotor body is secured to the housing through a bearing race assembly of the kind having an annular inner race that is secured to the second portion of the rotor body, an annular outer bearing race that is secured to the housing, and a plurality of bearings located between the races and whereby the portion of the shaft that extends through the reduced width section of bore in the rotor is provided with an external thread, and further comprising a locking nut that has an internal thread that engages the external thread, the locking nut being sized so that when located on the thread of the shaft the locking nut engages both the rotor and the inner bearing race whereby as the locking nut is tightened the shaft is pulled into engagement with the bore of the rotor towards the first end of the motor housing and, at the same time, the inner race of the bearing assembly is pressed by the locking nut onto the rotor in a direction towards the second end of the housing.

2. The electromechanical actuator according to claim 1 including an opening provided in an end wall of the housing that closes the second end of the housing to allow access to the locking nut.

3. The electromechanical actuator according to claim 1 in which the outer face of the rotor body that is closest to the first end of the housing is provided with a shoulder that locates an end face of the inner bearing, the locking nut tightening the inner race onto this shoulder.

4. The electromechanical actuator according to claim 1 in which the fixed part of the shaft has a cylindrical cross section along its length, so that the tapering portion is defined by a gradual reduction in the diameter of the fixing part.

5. The electromechanical actuator according to claim 1 in which the tapered portion extends over a major part of the bore in the rotor which the screw part contacts.

6. The electromechanical actuator according to claim 1 in which the tapered portion has a pressure angle relative to the axis of the rotor of between 1 degree and 10 degrees.

7. The electromechanical actuator according to claim 1 in which the tapered portion reduces in diameter linearly over its length.

8. The electromechanical actuator according to claim 1 in which the end of the rotor body is otherwise unsupported and overhung from the bearing assembly.

9. The electromechanical actuator according to claim 1 in which the second portion of the rotor body is located concentrically within the stator of the motor and the first portion of the rotor body is offset axially from the stator.

10. The electromechanical actuator according to claim 1 in which the housing, stator, rotor body and shaft are all generally cylindrical when viewed in cross section and all have their long axes aligned on a common central axis of the motor.

* * * * *